(12) United States Patent
Dower et al.

(10) Patent No.: US 12,475,228 B2
(45) Date of Patent: Nov. 18, 2025

(54) COMPUTE SYSTEMS INCLUDING A SECURITY PROCESSOR

(71) Applicant: Hewlett-Packard Development Company, L.P., Spring, TX (US)

(72) Inventors: Glen Douglas Dower, Fort Collins, CO (US); Peter Andrew Seiler, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 375 days.

(21) Appl. No.: 18/004,961

(22) PCT Filed: Jul. 14, 2020

(86) PCT No.: PCT/US2020/041994
§ 371 (c)(1),
(2) Date: Jan. 10, 2023

(87) PCT Pub. No.: WO2022/015292
PCT Pub. Date: Jan. 20, 2022

(65) Prior Publication Data
US 2023/0237157 A1     Jul. 27, 2023

(51) Int. Cl.
*G06F 21/57*     (2013.01)
*G06F 21/54*     (2013.01)
*G06F 21/79*     (2013.01)

(52) U.S. Cl.
CPC ............ *G06F 21/575* (2013.01); *G06F 21/54* (2013.01); *G06F 21/79* (2013.01)

(58) Field of Classification Search
CPC ...... G06F 21/57; G06F 21/572; G06F 21/575; G06F 21/577; G06F 21/54; G06F 21/79
See application file for complete search history.

(56) References Cited

U.S. PATENT DOCUMENTS

| | | | |
|---|---|---|---|
| 8,150,039 B2 | 4/2012 | De Cesare et al. | |
| 8,656,146 B2 | 2/2014 | Findeisen et al. | |
| 8,688,967 B2 | 4/2014 | Smith et al. | |
| 8,726,364 B2 | 5/2014 | Smith | |
| 8,910,307 B2* | 12/2014 | Kottilingal | H04N 21/835 |
| | | | 713/165 |
| 9,479,331 B2 | 10/2016 | De Cesare et al. | |
| 9,792,439 B2 | 10/2017 | Colnot | |
| 10,353,779 B2 | 7/2019 | Sharma et al. | |
| 10,515,218 B2* | 12/2019 | Ghetie | G06F 21/72 |
| 11,182,148 B2* | 11/2021 | Liu | G06F 9/4401 |
| 11,392,703 B2* | 7/2022 | Ghetie | G06F 21/575 |
| 11,533,172 B2* | 12/2022 | Park | H04L 9/0836 |
| 11,636,214 B2* | 4/2023 | Ndu | G06F 21/572 |
| | | | 726/22 |

(Continued)

*Primary Examiner* — Hosuk Song
(74) *Attorney, Agent, or Firm* — Quarles & Brady LLP

(57) ABSTRACT

A compute system includes a security processor, a component, a component memory, a first communication link, and a second communication link. The component memory stores machine readable instructions executable by the component. The first communication link communicatively couples the component memory to the security processor. The second communication link communicatively couples the component memory to the component. The security processor is to cryptographically authenticate the machine readable instructions stored in the component memory in a boot process.

15 Claims, 7 Drawing Sheets

(56) References Cited

U.S. PATENT DOCUMENTS

| | | | |
|---|---|---|---|
| 11,768,611 B2 * | 9/2023 | Kloth .................... | H04L 9/14 |
| | | | 713/2 |
| 12,069,169 B2 * | 8/2024 | Luciani, Jr. .......... | H04L 9/0861 |
| 2015/0121054 A1 | 4/2015 | Wu | |

* cited by examiner

COMPUTE SYSTEMS INCLUDING A SECURITY PROCESSOR

BACKGROUND

Compute systems may include components that read corresponding machine readable instructions (e.g., firmware) stored in a memory during a boot process. After the boot process, each of the components may execute the corresponding machine readable instructions to implement their individual functions within the compute system.

DETAILED DESCRIPTION

Figure 1A:
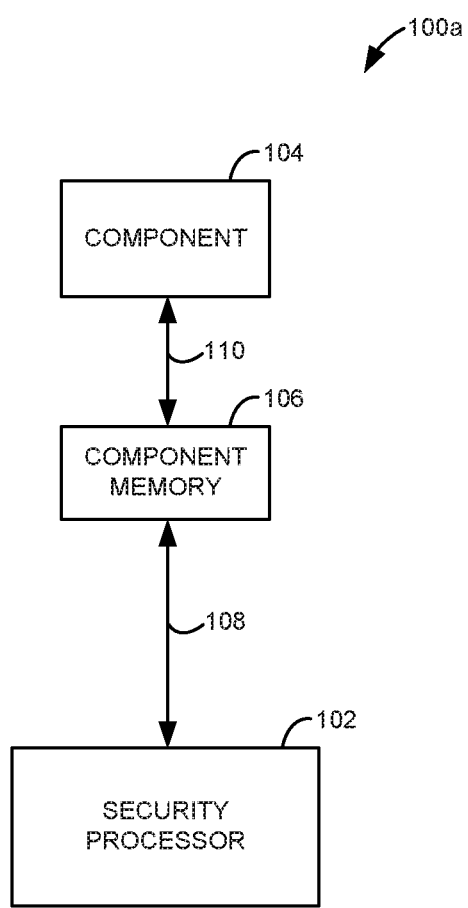
FIGS. 1A-1F are block diagrams illustrating various examples of a compute system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

In a compute system, it may be desirable to cryptographically authenticate machine readable instructions (e.g., firmware) for each component in a secure boot process before the machine readable instructions are loaded by their corresponding components. Cryptographic authentication for machine readable instructions before the machine readable instructions are executed by a component provides a layer of hardware security in a compute system. The cryptographic authentication may include asymmetric key exchange between a component and the machine readable instructions, encrypted certificate exchange from the machine readable instructions to the component, and encrypted hash check of the machine readable instructions against a secure image of the machine readable instructions.

For a component to cryptographically authenticate its corresponding machine readable instructions as described above, many complex mechanisms may be implemented on each component, such as pseudo random number generators, asymmetric and/or symmetric key generation and exchange, and encrypted hash generation mechanisms. If every discreet component in a compute system is enabled for a secure boot process, these mechanisms would be implemented in numerous components adding cost and complexity to each individual component. In addition, many components do not have the proper architecture to support these cryptographic mechanisms. With multiple components spread across a compute system including private keys, encrypted information, and other security data, there is an increased risk of compromising this information and data. Therefore, it would be advantageous to have secure data and security mechanisms stored in a centralized security processor.

Accordingly, disclosed herein are examples of compute systems including a centralized security processor to perform a secure boot process of machine readable instructions (e.g., firmware) before the machine readable instructions are read and executed on corresponding components in the compute system. The machine readable instructions for each corresponding component may be stored in a corresponding memory for each component. The memory for each component includes a dual communication link including a first communication link to the centralized security processor and a second communication link to the corresponding component. The first communication link is used to cryptographically authenticate the machine readable instructions for each component, and the second communication link is used to read the machine readable instructions for execution within the corresponding component once the machine readable instructions have been authenticated by the centralized security processor. The first communication link and the second communication link for the memory for each component may be implemented over the same communication bus, such that both the centralized security processor and the corresponding component share the same communication interface to the memory. Therefore, memory devices including a single communication interface may be used for the component memories.

The compute systems described herein avoid implementing extensive cryptography capabilities across multiple components in a compute system. Components that use the machine readable instructions are not cryptography enabled. Accordingly, legacy components and subsystems, such as components or subsystems whose architecture prohibits integration of cryptographic capabilities, may be upgraded to be secure boot enabled without adding cryptographic capabilities to the components or subsystems. In addition, the compute systems described herein may save money on cryptographic certifications (e.g., Common Criteria, FIPS, ANSSI, NIST, etc.), since the centralized security processor would include cryptographic capabilities to be certified but each of the components or subsystems would not include cryptographic capabilities to be certified. Thus, one component of a compute system would be certified instead of multiple components of the compute system. Cryptographic certifications generally cost hundreds of thousands of dollars and months to obtain. By certifying one component, compute system designers could use low-demand components in a secure boot environment and not pay a large overhead to integrate and certify cryptographic capabilities within the low volume components.

Holding the secure data in a centralized processor versus scattering the secure data over multiple components across a compute system also allows a higher level of security, since there is one access point to secure data rather than multiple access points. Further, in a typical secure boot architecture, multiple components are enabled for secure mechanisms, which generally increases the unit cost and research and development investment into each individual component. In this case, the security architecture tends to become more minimalistic when implemented multiple times on many different components. In contrast, with security mechanisms integrated into a single, centralized processor as disclosed herein, a high investment into the security architecture and processes may be put into that single processor ensuring the greatest protection from physical attacks and software attacks.

FIG. 1A is a block diagram illustrating one example of a compute system 100*a*. Compute system 100*a* includes a security processor 102, a component 104, a component memory 106, a first communication link 108, and a second communication link 110. The component memory 106 stores machine readable instructions executable by the component 104. The first communication link 108 communicatively couples the component memory 106 to the security processor 102. The second communication link 110 communicatively couples the component memory 106 to the component 104. The security processor 102 is to cryptographically authenticate the machine readable instructions stored in the component memory 106 in a boot process.

Compute system 100a may be a computer system (e.g., server, desktop, laptop, etc.), a tablet, a cellular phone, or another system that performs computing functions. In one example, security processor 102, component 104, component memory 106, first communication link 108, and second communication link 110 may be arranged on a motherboard of the compute system 100a. Security processor 102 may include a MicroController Unit (MCU), a Programmable System On a Chip (PSOC), a Central Processing Unit (CPU), an embedded controller, or another suitable processor. Security processor 102 may be based on the ARM Cortex CyptoIsland or TrustZone architectures or another suitable security architecture.

The component 104 may include a Universal Serial Bus (USB) hub, a Local Area Network (LAN) controller, a Baseboard Management Controller (BMC), an Embedded Controller (EC), a Super Input/Output (SIO) controller, a high-speed switch controller, a signal conditioning controller, an external port controller, a power delivery controller, or another suitable compute system component. The first communication link 108 may include a Serial Peripheral Interface (SPI) communication link, an enhanced Serial Peripheral Interface (eSPI) communication link, an Inter-Integrated Circuit (I2C) communication link, a SenseWire (I3C) communication link, a System Management Bus (SMBus) communication link, or another suitable communication link. The second communication link 110 may include an SPI communication link, an eSPI communication link, an I2C communication link, a SenseWire (I3C) communication link, an SMBus communication link, or another suitable communication link.

Thus, component memory 106 includes a dual communication link, however, a single communication link should be active at a given point in time to reduce read and/or write conflicts. First communication link 108 may be active and second communication link 110 may be inactive to allow security processor 102 to cryptographically authenticate the machine readable instructions stored in component memory 106 during a secure boot process before the machine readable instructions are used by the component 104. Second communication link 110 may be active and first communication link 108 may be inactive to allow component 104 to use the machine readable instructions stored in component memory 106.

The first communication link 108 and the second communication link 110 may be electrically coupled to the same physical communication interface of the component memory 106. In one example, the first communication link 108 and the second communication link 110 may be electrically coupled to the same physical communication interface of the component memory 106 by wire ORing the first communication link 108 and the second communication link 110 and interfacing to the component memory 106. In another example, as will be described below with reference to FIG. 1F, the first communication link 108 and the second communication link 110 may be electrically coupled to the same physical communication interface of the component memory 106 by externally multiplexing the first communication link 108 and the second communication link 110 to the component memory 106.

Figure 1B:
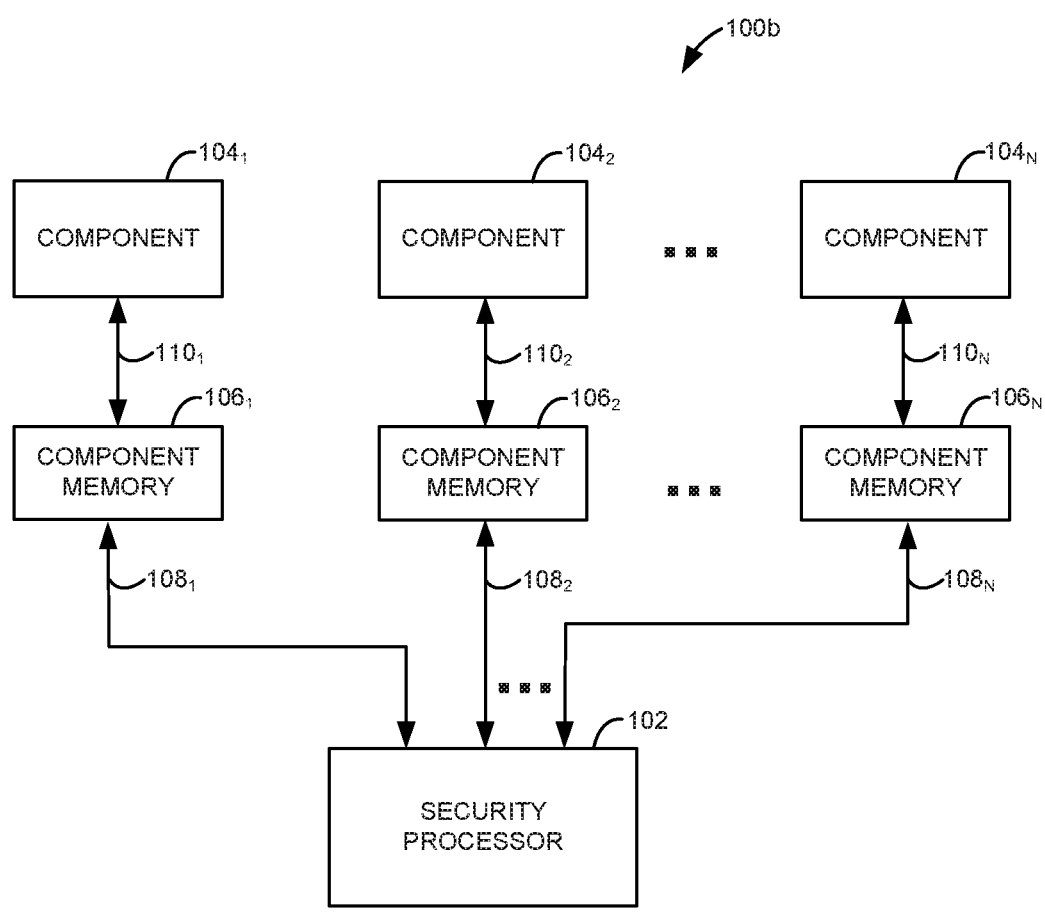

FIG. 1B is a block diagram illustrating another example of a compute system 100b. Compute system 100b includes a security processor 102, a plurality of components $104_1$ to $104_N$, a plurality of component memories $106_1$ to $106_N$, a plurality of first communication links $108_1$ to $108_N$, and a plurality of second communication links $110_1$ to $110_N$, where "N" is any suitable number of components. Each component memory $106_1$ to $106_N$ corresponds to a component $104_1$ to $104_N$ and stores machine readable instructions executable by the corresponding component $104_1$ to $104_N$, respectively. Each first communication link $108_1$ to $108_N$ communicatively couples the corresponding component memory $106_1$ to $106_N$ to the security processor 102, respectively. Each second communication link $110_1$ to $110_N$ communicatively couples the corresponding component memory $106_1$ to $106_N$ to the corresponding component $104_1$ to $104_N$, respectively.

The security processor 102 is to cryptographically authenticate the machine readable instructions stored in each of the plurality of component memories $106_1$ to $106_N$ in a boot process. In one example, the security processor 102 is configured to cryptographically authenticate the machine readable instructions stored in each of the plurality of component memories $106_1$ to $106_N$ in parallel during the boot process. In another example, the security processor 102 is configured to cryptographically authenticate the machine readable instructions stored in each of the plurality of component memories $106_1$ to $106_N$ in series during the boot process.

Compute system 100b may be a computer system (e.g., server, desktop, laptop, etc.), a tablet, a cellular phone, or another system that performs computing functions. In one example, security processor 102, components $104_1$ to $104_N$, component memories $106_1$ to $106_N$, first communication links $108_1$ to $108_N$, and second communication links $110_1$ to $110_N$ may be arranged on a motherboard of the compute system 100b.

Each component $104_1$ to $104_N$ may include a USB hub, a LAN controller, a BMC, an EC, an SIO controller, a high-speed switch controller, a signal conditioning controller, an external port controller, a power delivery controller, or another suitable compute system component. Each first communication link $108_1$ to $108_N$ may include an SPI communication link, an eSPI communication link, an I2C communication link, a SenseWire (I3C) communication link, an SMBus communication link, or another suitable communication link. Each second communication link $110_1$ to $110_N$ may include an SPI communication link, an eSPI communication link, an I2C communication link, a SenseWire (I3C) communication link, an SMBus communication link, or another suitable communication link. The first communication links $108_1$ to $108_N$ may include a single type of communication link or a mixture of different types of communication links. Likewise, the second communication links $110_1$ to $110_N$ may include a single type of communication link or a mixture of different types of communication links.

Figure 1C:
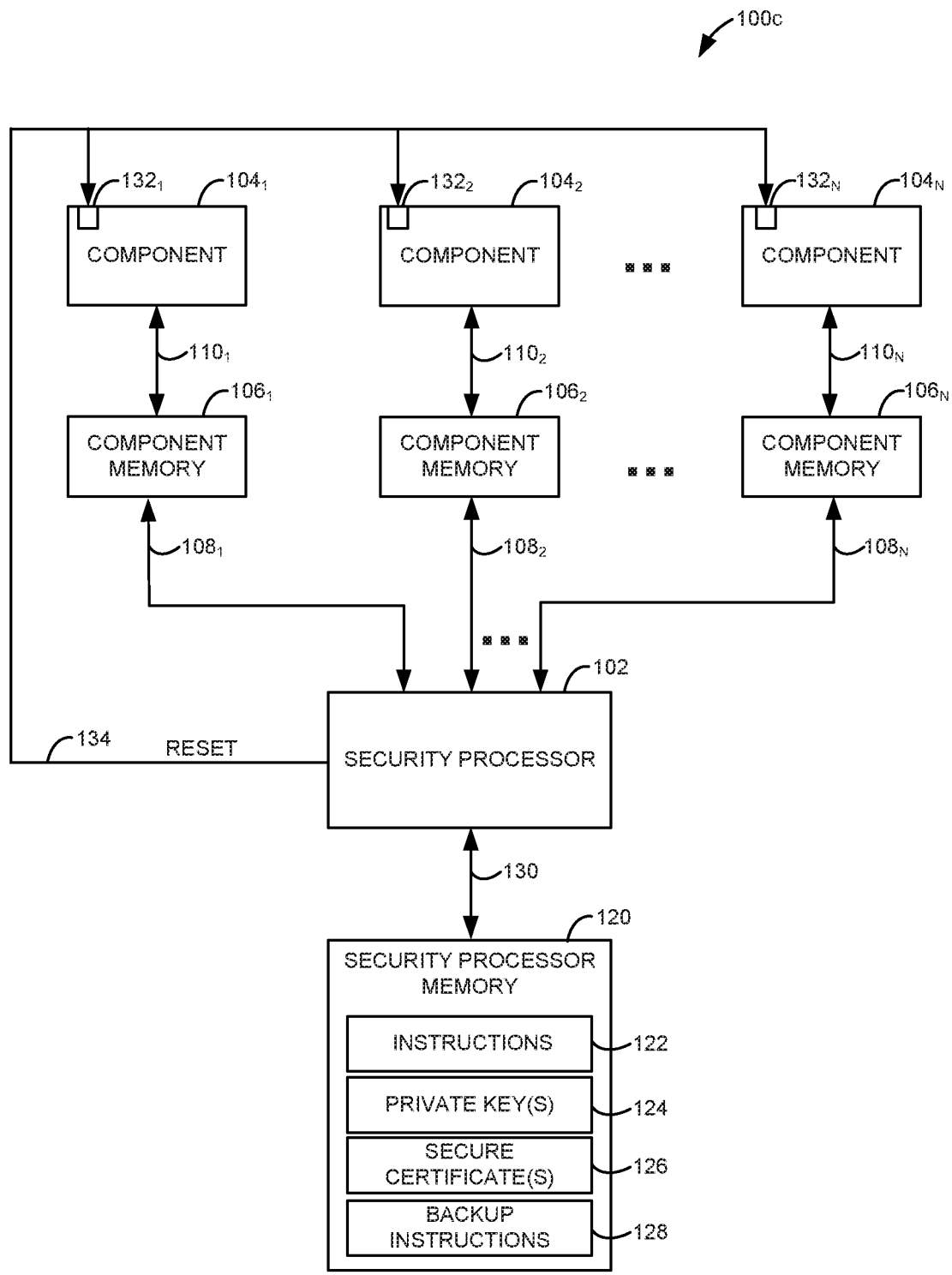

FIG. 1C is a block diagram illustrating another example of a compute system 100c. Compute system 100c is similar to compute system 100b previously described and illustrated with reference to FIG. 1B, except that compute system 100c includes additional features. In addition to a security processor 102, a plurality of components $104_1$ to $104_N$, a plurality of component memories $106_1$ to $106_N$, a plurality of first communication links $108_1$ to $108_N$, and a plurality of second communication links $110_1$ to $110_N$, compute system $100c$ includes a security processor memory 120. The security processor memory 120 is communicatively coupled to the security processor 102 through a communication link 130. The security processor memory 120 stores machine readable instructions 122 executable by the security processor 102, a private key(s) 124, a secure certificate(s) 126, and backup machine readable instructions 128 for the component memories $106_1$ to $106_N$.

The security processor 102 may execute the machine readable instructions 122 stored in security processor memory 120 to cryptographically authenticate the machine readable instructions stored in each of the component memories $106_1$ to $106_N$. The security processor 102 is to cryptographically authenticate the machine readable instructions stored in each of the component memories $106_1$ to $106_N$ by asymmetric key exchange, certificate verification, and secure hash algorithm (SHA) checks between each of the component memories $106_1$ to $106_N$ and the security processor 102. In one example, the asymmetric key exchange may be based on the private key(s) 124 stored in the security processor memory 120, and the certificate verification may be based on the secure certificate(s) 126 stored in the security processor memory 120.

The security processor 102 is to erase a selected component memory $106_1$ to $106_N$ and write backup machine readable instructions to the selected component memory $106_1$ to $106_N$ in response to the cryptographic authentication of the selected component memory $106_1$ to $106_N$ failing. In one example, the security processor 102 writes backup machine readable instructions to the selected component memory $106_1$ to $106_N$ from the backup instructions 128 of the security processor memory 120 in response to the cryptographic authentication of the selected component memory $106_1$ to $106_N$ failing.

In this example, each of the plurality of components $104_1$ to $104_N$ includes a reset input $132_1$ to $132_N$, respectively. The security processor 102 is communicatively coupled to each of the plurality of reset inputs $132_1$ to $132_N$ through a reset signal path 134. The security processor 102 is to disable each of the plurality of components $104_1$ to $104_N$ by applying a signal having a first state (e.g., a logic high "1" state or a logic low "0" state) to the reset input $132_1$ to $132_N$ of each of the plurality of components $104_1$ to $104_N$, respectively, while the security processor 102 is cryptographically authenticating the machine readable instructions stored in each of the plurality of component memories $106_1$ to $106_N$.

Once the security processor 102 has cryptographically authenticated the machine readable instructions stored in each of the plurality of component memories $106_1$ to $106_N$, the security processor 102 enables each of the plurality of components $104_1$ to $104_N$ by applying a signal having a second state (e.g., opposite to the first state) to the reset input $132_1$ to $132_N$ of each of the plurality of components $104_1$ to $104_N$, respectively. With each of the plurality of components $104_1$ to $104_N$ enabled, each of the components $104_1$ to $104_N$ may load and execute the machine readable instructions stored in the corresponding component memories $106_1$ to $106_N$, respectively.

Figure 1D:
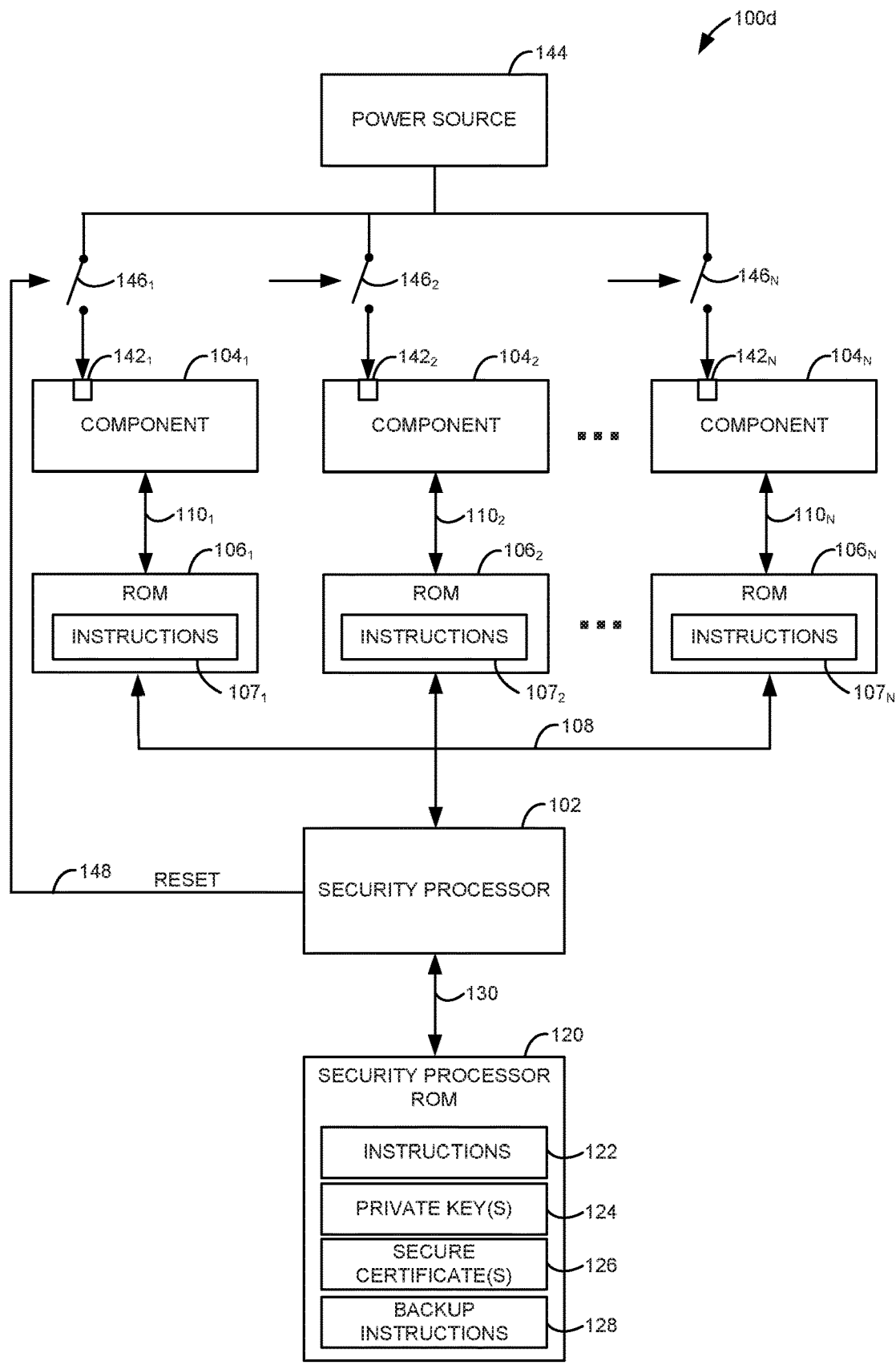

FIG. 1D is a block diagram illustrating another example of a compute system $100d$. Compute system $100d$ includes a single security processor 102, a plurality of components $104_1$ to $104_N$, a plurality of Read-Only Memories (ROMs) $106_1$ to $106_N$, a first communication link 108, and a plurality of second communication links $110_1$ to $110_N$. In addition, compute system $100d$ includes a security processor ROM 120, a power source 144, and a plurality of switches $146_1$ to $146_N$. Each ROM $106_1$ to $106_N$ corresponds to a component $104_1$ to $104_N$ and stores machine readable instructions $107_1$ to $107_N$ executable by the corresponding component $104_1$ to $104_N$. Each ROM $106_1$ to $106_N$ is communicatively coupled to the single security processor 102 through a first communication link 108 and to the corresponding component $104_1$ to $104_N$ through a corresponding second communication link $110_1$ to $110_N$. Each of the plurality of ROMs $106_1$ to $106_N$ may include a Serial Peripheral Interface (SPI) ROM, an Electrically Erasable Programmable Read-Only Memory (EEPROM), a flash memory, or another suitable ROM. Security processor ROM 120 may include an SPI ROM, an EEPROM, a flash memory, or another suitable ROM.

In this example, each of the plurality of components $104_1$ to $104_N$ includes a power input $142_1$ to $142_N$, respectively. Each switch $146_1$ to $146_N$ is electrically coupled between the power source 144 and a power input $142_1$ to $142_N$ of the corresponding component $104_1$ to $104_N$, respectively. The control input of each switch $146_1$ to $146_N$ is electrically coupled to the security processor 102 through a reset signal path 148. In response to the security processor 102 applying a reset signal having a first state to reset signal path 148, each of the switches $146_1$ to $146_N$ are opened to remove power from the corresponding components $104_1$ to $104_N$. With power removed from each of the components $104_1$ to $104_N$, the components $104_1$ to $104_N$ are disabled. In response to the security processor 102 applying a reset signal having a second state to reset signal path 148, each of the switches $146_1$ to $146_N$ are closed to apply power to the corresponding components $104_1$ to $104_N$. With power applied to the components $104_1$ to $104_N$, the components $104_1$ to $104_N$ are enabled to read and execute the corresponding machine readable instructions $107_1$ to $107_N$ stored in the corresponding ROMs $106_1$ to $106_N$, respectively. Each switch $146_1$ to $146_N$ may include a transistor(s), a logic gate(s), and/or other suitable circuitry for selectively applying and removing power from power source 144 to each component $104_1$ to $104_N$.

The security processor 102 is to, in a boot process, disable each of the plurality of components $104_1$ to $104_N$, cryptographically authenticate the machine readable instructions $107_1$ to $107_N$ stored in each of the ROMs $106_1$ to $106_N$ with each of the plurality of components $104_1$ to $104_N$ disabled, and enable each of the plurality of components $104_1$ to $104_N$ with the machine readable instructions $107_1$ to $107_N$ stored in each of the ROMs $106_1$ to $106_N$ cryptographically authenticated. In one example, the security processor 102 is to cryptographically authenticate the machine readable instructions $107_1$ to $107_N$ stored in each of the ROMs $106_1$ to $106_N$ by asymmetric key exchange, certificate verification, and SHA checks between each of the ROMs $106_1$ to $106_N$ and the security processor 102.

In this example, the security processor 102 is to control each of the plurality of switches $146_1$ to $146_N$ to remove power from each of the plurality of components $104_1$ to $104_N$ while the security processor 102 is cryptographically authenticating the machine readable instructions $107_1$ to $107_N$ stored in each of the plurality of ROMs $106_1$ to $106_N$. The security processor 102 is to erase a selected ROM $106_1$ to $106_N$ and write backup machine readable instructions to the selected ROM $106_1$ to $106_N$ in response to the cryptographic authentication of the selected ROM $106_1$ to $106_N$ failing.

In this example, first communication link 108 is a common communication link communicatively coupled between the security processor 102 and each of the plurality of ROMs $106_1$ to $106_N$. In other examples, a first subset of the plurality of ROMs $106_1$ to $106_N$ may be communicatively coupled to the security processor 102 through a corresponding discrete communication link as previously described and illustrated with reference to FIGS. 1B and 1C, and a second subset of the plurality of ROMs $106_1$ to $106_N$ may be communicatively coupled to the security processor 102 through a shared communication link.

Figure 1E:
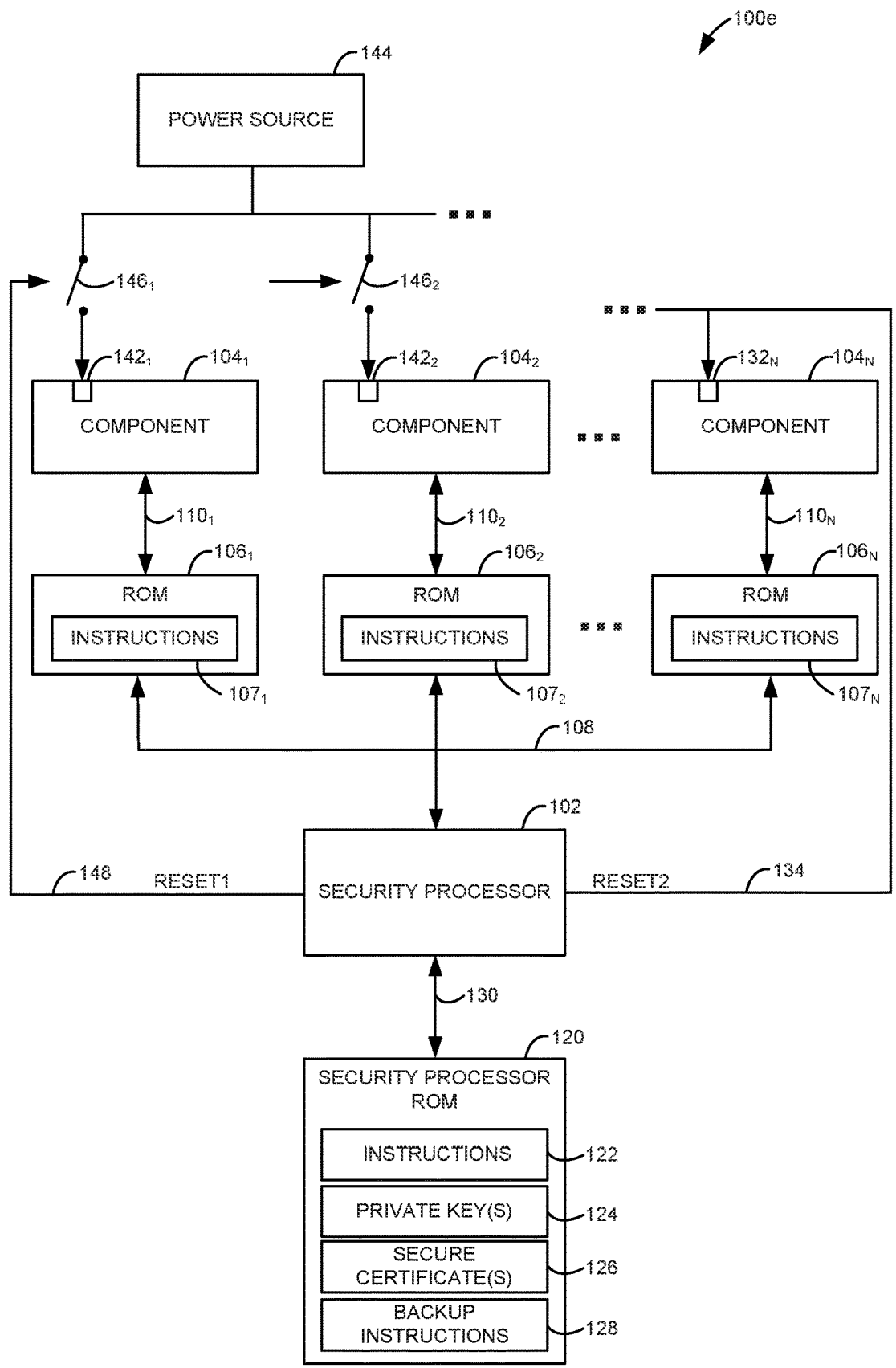

FIG. 1E is a block diagram illustrating another example of a compute system 100e. Compute system 100e is similar to compute system 100d previously described and illustrated with reference to FIG. 1D, except that compute system 100e includes a single component or multiple components that are enabled and disabled by the security processor 102 via a corresponding reset input of the component(s) and a single component or multiple components that are enabled and disabled by the security processor 102 via a power input of the component(s). In this example, components $104_1$ and $104_2$ include power inputs $142_1$ and $142_2$, respectively, as previously described and illustrated with reference to FIG. 1D, and component $104_N$ includes a reset input $132_N$ as previously described and illustrated with reference to FIG. 1C. Each switch $146_1$ and $146_2$ is electrically coupled between the power source 144 and the power input $142_1$ and $142_2$ of the corresponding component $104_1$ and $104_2$, respectively. The control input of switches $146_1$ and $146_2$ are electrically coupled to security processor 102 through a first reset (RESET1) signal path 148. The reset input $132_N$ of component $104_N$ is electrically coupled to security processor 102 through as second reset (RESET2) signal path 134.

In this example, the security processor 102 is to control each of the switches $146_1$ and $146_2$ to remove power from each of the components $104_1$ and $104_2$ and to disable component $104_N$ through reset input $132_N$ while the security processor 102 is cryptographically authenticating the machine readable instructions $107_1$ to $107_N$ stored in each of the plurality of ROMs $106_1$ to $106_N$. Once the machine readable instructions $107_1$ to $107_N$ stored in each of the plurality of ROMs $106_1$ to $106_N$ are cryptographically authenticated, the security processor 102 is to control each of the switches $146_1$ and $146_2$ to apply power to each of the components $104_1$ and $104_2$ and to enable component $104_N$ through reset input $132_N$.

Figure 1F:
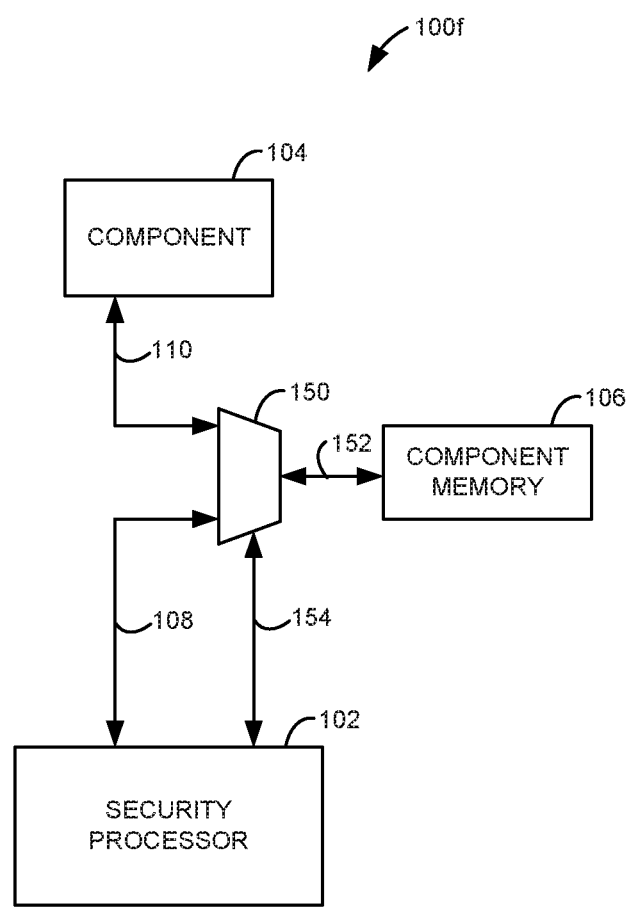

FIG. 1F is a block diagram illustrating another example of a compute system 100f. Compute system 100f is similar to compute system 100a previously described and illustrated with reference to FIG. 1A, except that compute system 100f includes a multiplexer 150. A first input of multiplexer 150 is electrically coupled to the first communication link 108. A second input of multiplexer 150 is electrically coupled to the second communication link 110. The output of multiplexer 150 is electrically coupled to a single communication interface of the component memory 106 through a communication link 152. The control input of multiplexer 150 is electrically coupled to the security processor 102 through a control signal path 154.

In this example, security processor 102 controls multiplexer 150 to connect either the first communication link 108 or the second communication link 110 to the component memory 106. Security processor 102 connects the first communication link 108 to the component memory 106 with the security processor 102 cryptographically authenticating the machine readable instructions stored in the component memory 106 during a secure boot process. Security processor 102 connects the second communication link 110 to the component memory 106 once the secure boot process is complete so that component 104 may use the machine readable instructions stored in the component memory 106.

Figure 2A:
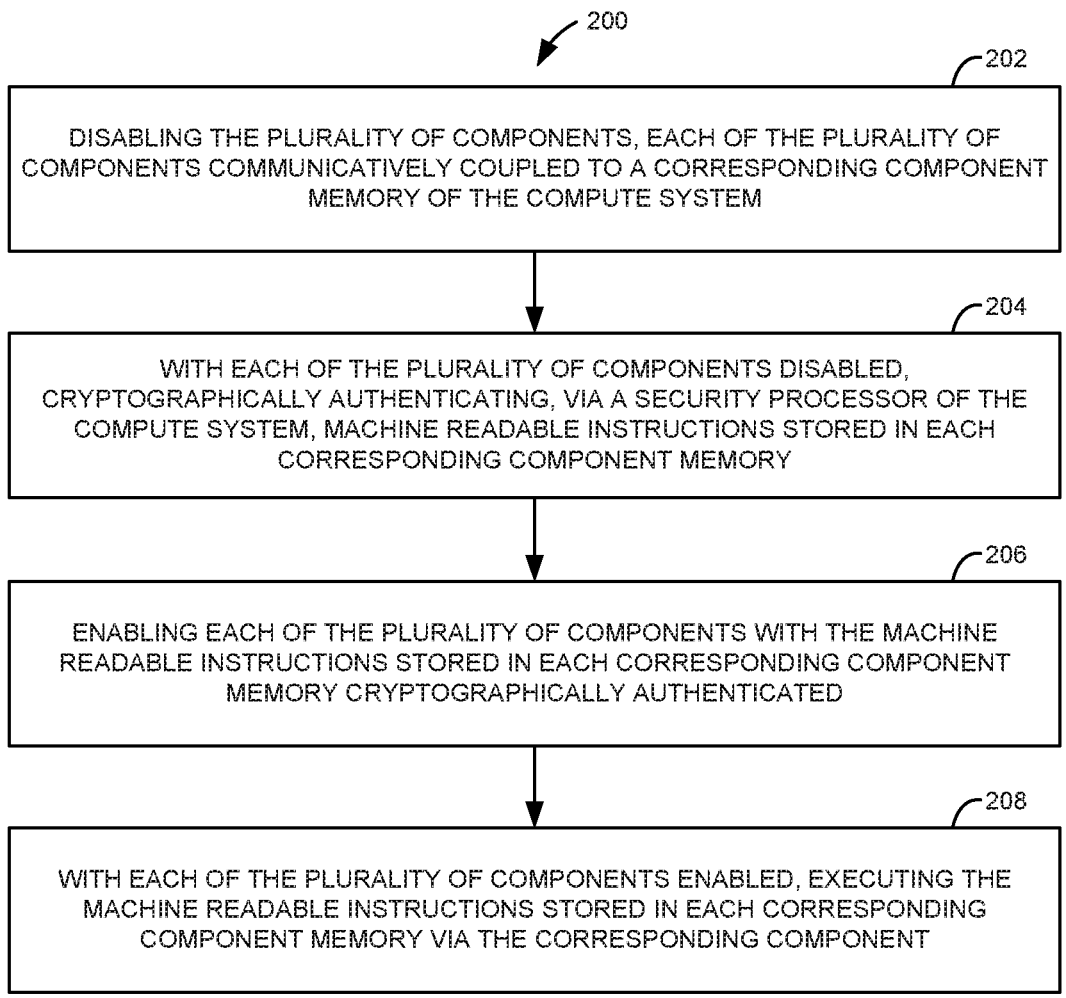
FIGS. 2A and 2B are flow diagrams illustrating one example of a method to secure boot a plurality of components within a compute system.
Figure 2B:
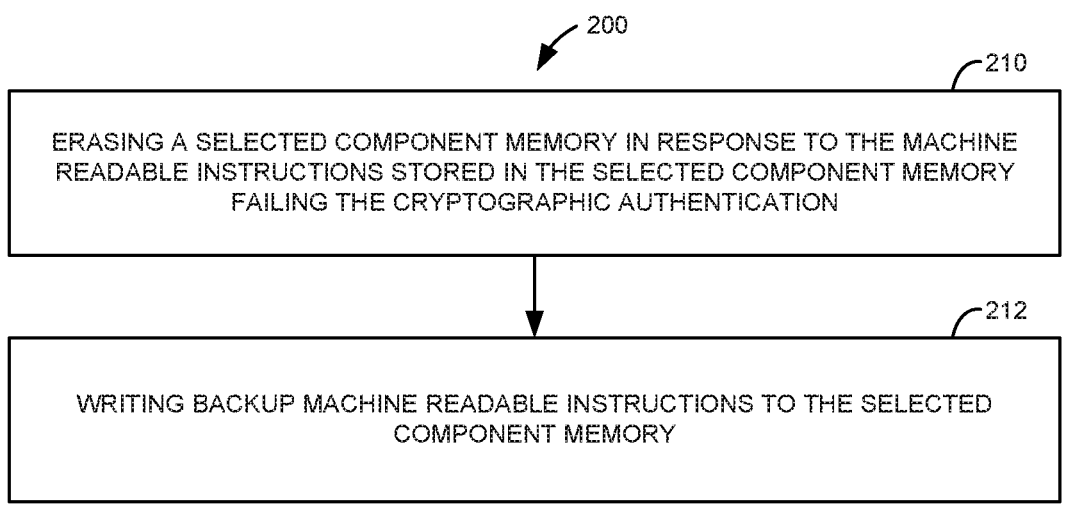

FIGS. 2A and 2B are flow diagrams illustrating one example of a method 200 to secure boot a plurality of components within a compute system. In one example, method 200 may be implemented by compute system 100a, 100b, 100c, 100d, or 100e previously described and illustrated with reference to FIGS. 1A-1E, respectively. As illustrated in FIG. 2A at 202, method 200 includes disabling the plurality of components (e.g., components $104_1$ to $104_N$), each of the plurality of components communicatively coupled to a corresponding component memory (e.g., component memory or ROM $106_1$ to $106_N$) of the compute system. At 204, method 200 includes with each of the plurality of components disabled, cryptographically authenticating, via a security processor (e.g., security processor 102) of the compute system, machine readable instructions (e.g., instructions $107_1$ to $107_N$) stored in each corresponding component memory. At 206, method 200 includes enabling each of the plurality of components with the machine readable instructions stored in each corresponding component memory cryptographically authenticated. At 208, method 200 includes with each of the plurality of components enabled, executing the machine readable instructions stored in each corresponding component memory via the corresponding component.

In one example, disabling the plurality of components comprises applying a signal having a first state to a reset input (e.g., reset input $132_1$ to $132_N$) of each of the plurality of components. In this case, enabling each of the plurality of components comprises applying a signal having a second state to the reset input of each of the plurality of components. In another example, disabling the plurality of components comprises removing power from each of the plurality of components (e.g., via switches $146_1$ to $146_N$). In this case, enabling each of the plurality of components comprises applying power to each of the plurality of components.

As illustrated in FIG. 2B at 210, method 200 may further include erasing a selected component memory in response to the machine readable instructions stored in the selected component memory failing the cryptographic authentication. At 212, method 200 may further include writing backup machine readable instructions (e.g., from backup instructions 128) to the selected component memory.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A compute system comprising:
a security processor;
a component;
a component memory storing machine readable instructions executable by the component;
a first communication link communicatively coupling the component memory to the security processor; and
a second communication link communicatively coupling the component memory to the component,
wherein the security processor is to;
send a signal to a reset pin of the component to disable the component; and
cryptographically authenticate, while the component is disabled, the machine readable instructions stored in the component memory in a boot process.

2. The compute system of claim 1, further comprising:
a security processor memory communicatively coupled to the security processor, the security processor memory storing machine readable instructions executable by the security processor, a private key, a secure certificate, and backup machine readable instructions for the component memory.

3. The compute system of claim 1, wherein the component comprises a reset input, and
wherein the security processor is to disable the component by applying a signal having a first state to the reset input of the component while the security processor is cryptographically authenticating the machine readable instructions stored in the component memory.

4. The compute system of claim 1, further comprising:
a switch electrically coupled between a power source and a power input of the component,
wherein the security processor is to control the switch to remove power from the component while the security processor is cryptographically authenticating the machine readable instructions stored in the component memory.

5. The compute system of claim 1, wherein the component comprises a Universal Serial Bus (USB) hub, a Local Area Network (LAN) controller, a Baseboard Management Controller (BMC), an Embedded Controller (EC), a Super Input/Output (SIO) controller, a high-speed switch controller, a signal conditioning controller, an external port controller, or a power delivery controller.

6. The compute system of claim 1, wherein each of the first communication link and the second communication link comprise a Serial Peripheral Interface (SPI) communication link, an enhanced Serial Peripheral Interface (eSPI) communication link, an Inter-Integrated Circuit (I2C) communication link, a SenseWire (I3C) communication link, or a System Management Bus (SMBus) communication link.

7. The compute system of claim 1, wherein the first communication link and the second communication link are electrically coupled to a single communication interface of the component memory.

8. A compute system comprising:
a single security processor;
a plurality of components; and
a plurality of Read-Only Memories (ROMs), each ROM corresponding to a component of the plurality of components, each ROM storing machine readable instructions executable by the corresponding component, and each ROM communicatively coupled to the single security processor and the corresponding component;
wherein the single security processor is to, in a boot process, send a signal to a reset pin of each of the plurality of components to disable each of the plurality of components, cryptographically authenticate, while the plurality of components are disabled, the machine readable instructions stored in each of the ROMs with each of the plurality of components disabled, and enable each of the plurality of components with the machine readable instructions stored in each of the ROMs cryptographically authenticated.

9. The compute system of claim 8, wherein each of the plurality of ROMs comprises a Serial Peripheral Interface (SPI) ROM, an Electrically Erasable Programmable Read-Only Memory (EEPROM), or a flash memory.

10. The compute system of claim 8, wherein the single security processor is to cryptographically authenticate the machine readable instructions stored in each of the ROMs by asymmetric key exchange, certificate verification, and secure hash algorithm (SHA) checks between each of the ROMs and the single security processor.

11. The compute system of claim 8, wherein the single security processor is to erase a selected ROM of the plurality of ROMs and write backup machine readable instructions to the selected ROM in response to the cryptographic authentication of the selected ROM failing.

12. A method to secure boot a plurality of components within a compute system, the method comprising:
sending a signal to a reset pin of each of the plurality of components;
disabling the plurality of components, each of the plurality of components communicatively coupled to a corresponding component memory of the compute system;
with each of the plurality of components disabled, cryptographically authenticating, via a security processor of the compute system, machine readable instructions stored in each corresponding component memory;
enabling each of the plurality of components with the machine readable instructions stored in each corresponding component memory cryptographically authenticated; and
with each of the plurality of components enabled, executing the machine readable instructions stored in each corresponding component memory via the corresponding component.

13. The method of claim 12, wherein disabling the plurality of components comprises applying a signal having a first state to a reset input of each of the plurality of components, and
wherein enabling each of the plurality of components comprises applying a signal having a second state to the reset input of each of the plurality of components.

14. The method of claim 12, wherein disabling the plurality of components comprises removing power from each of the plurality of components, and
wherein enabling each of the plurality of components comprises applying power to each of the plurality of components.

15. The method of claim 12, further comprising:
erasing a selected component memory in response to the machine readable instructions stored in the selected component memory failing the cryptographic authentication; and
writing backup machine readable instructions to the selected component memory.

* * * * *